P. R. POWELL.
FOLDING CAMERA.
APPLICATION FILED JAN. 6, 1916.
1,202,221.
Patented Oct. 24, 1916.
2 SHEETS—SHEET 1.
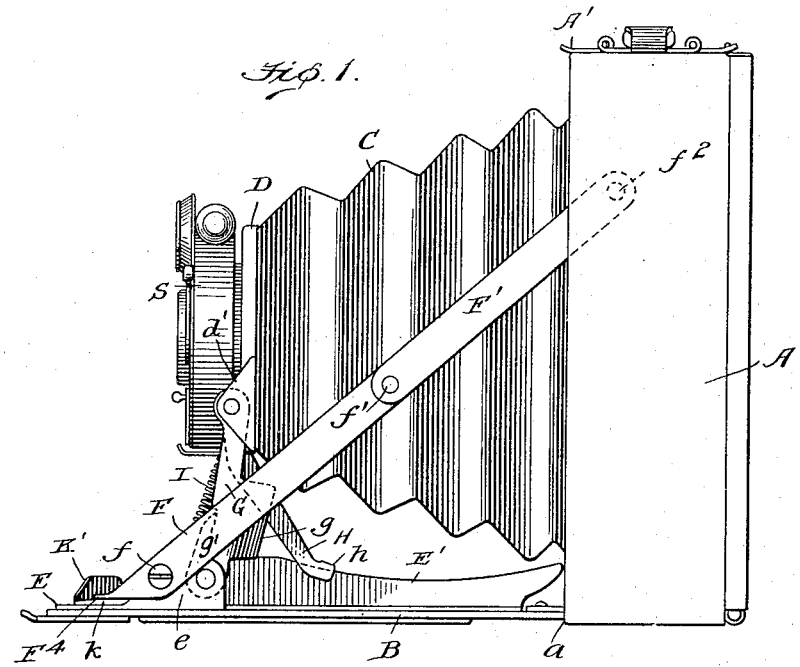
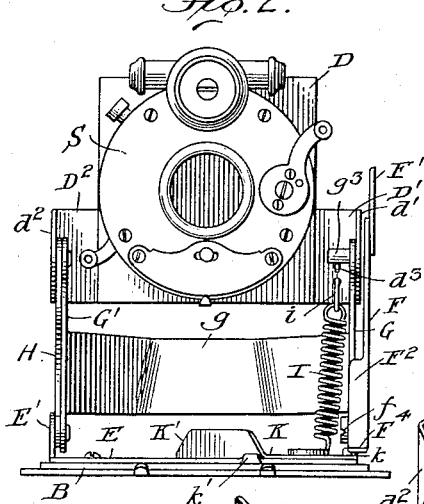
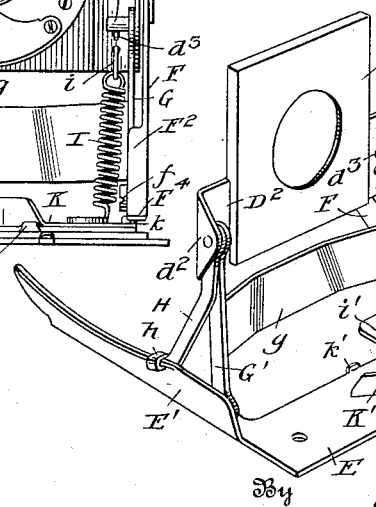
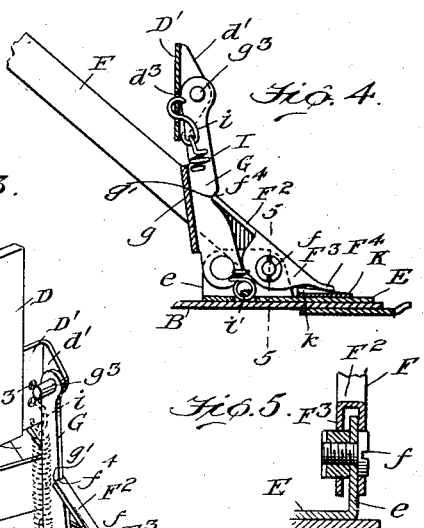
Inventor
Paul R. Powell
By
his Attorneys

P. R. POWELL.
FOLDING CAMERA.
APPLICATION FILED JAN. 6, 1916.

1,202,221.

Patented Oct. 24, 1916.
2 SHEETS—SHEET 2.

Inventor
Paul R. Powell
By
his Attorneys

UNITED STATES PATENT OFFICE.

PAUL R. POWELL, OF BALTIMORE, MARYLAND.

FOLDING CAMERA.

1,202,221.   Specification of Letters Patent.   Patented Oct. 24, 1916.

Application filed January 6, 1916. Serial No. 70,682.

*To all whom it may concern:*

Be it known that I, PAUL R. POWELL, a citizen of the United States, residing at Baltimore, State of Maryland, have invented certain new and useful Improvements in Folding Cameras; and I do hereby declare the following to be a full, clear, and exact description of the same, reference being had to the accompanying drawings, forming part of this specification.

This invention relates to photographic cameras and particularly to that class known as folding cameras which are adapted to be folded into a small compass for carrying around and to be extended when it is desired to make an exposure. In cameras of the above type, the camera body, as a rule, is provided with a pivoted front or cover over which the frame carrying the lens and the bellows connecting said frame with the body of the camera are extended when the front has been opened, the opened front forming a base or support for the extended frame and bellows. The frame and bellows are folded within the camera body, when the camera is not in use, and the front or cover closed, making an exceedingly compact article for carrying around.

The object of the present invention is to provide a novel construction for quickly shifting the parts of the camera from folded to extended position for making exposures, and also an improved arrangement for adjusting the focus of the lens when the parts have been extended.

The invention consists in the construction, arrangement and combinations of parts hereinafter more fully described, the novel features being pointed out in the appended claims.

Figure 6:
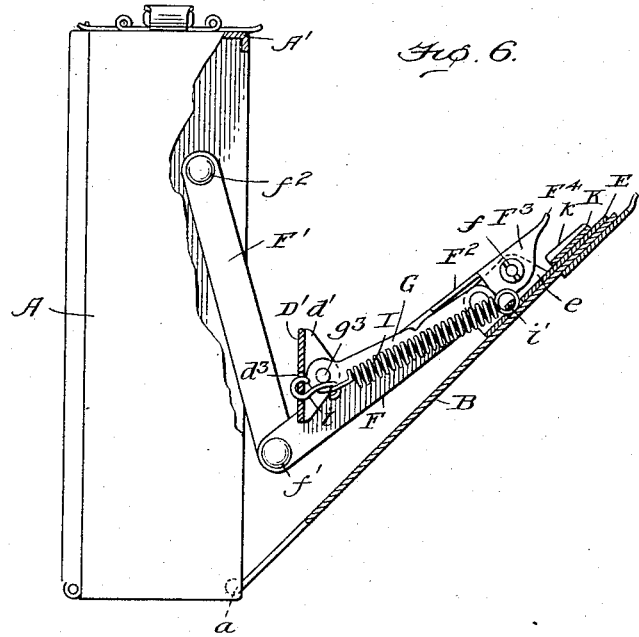
Figure 7:
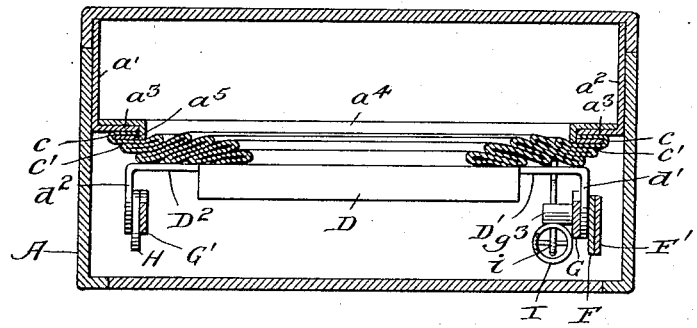

In the drawings:—Figure 1 is a side elevation of one type of camera embodying the present improvements, the front or cover, frame supporting the lens and shutter, and the bellows being shown in extended position. Fig. 2 is a front elevation of the extended front or cover and frame. Fig. 3 is a perspective of the extended front or cover and frame. Fig. 4 is a detail of some of the connections employed for extending the frame and bellows when the front or cover is opened. Fig. 5 is a transverse vertical section taken in a plane indicated by the line 5—5 of Fig. 4. Fig. 6 is a side elevation, partly in section, of a camera with the bellows, lens, and shutter omitted, but showing a portion of the extensible frame, the parts being in the position which they assume when the camera is partly closed. Fig. 7 is a transverse horizontal section of a modification showing the camera closed.

Like characters of reference in the several figures indicate the same parts.

As shown in the accompanying drawings, the camera body A, which may be of any approved construction adapted for the reception of the sensitized material on which the exposures are made, is provided with a cover or front B. In the present instance, this cover or front is pivoted to the lower edge $a$ of the camera body, and located at the upper edge of said body is a clip or fastener A′ whereby the front or cover may be retained in position when the parts are folded within the camera body and the cover closed. The bellows C may be of any well known type and is suitably secured to the interior of the camera body A, as indicated in Fig. 7. For this purpose the inner walls $a'$, $a^2$ of the camera body A are respectively provided with inwardly projecting front flanges $a^3$ which form the support for a frame $a^4$ located to the rear of the flanges $a^3$ and having forwardly extending ledges $a^5$ engaging the edges of the flanges $a^3$. The inner end $c$ of the bellows is secured to the outer faces of the flanges $a^3$ and retained by suitable strips $c'$ as shown in Fig. 7. The front frame D to which the outer end of the bellows C is secured, is adapted for the support of a lens (not shown) and a shutter S, of any preferred type. It will be understood that the front frame D, supporting the lens and shutter, will be retracted within and withdrawn from the interior of the camera body A as the camera is folded and extended, and that the movement of the frame D also extends and collapses the bellows, this being a feature of operation common to cameras of the folding type.

The present invention has particular reference to the provision of an improved construction, whereby the movement of the front or cover B, incidental to folding and extending the camera is communicated to the frame D, and, assuming that the operation be extending the camera to make exposures, through the agency of the improved connections provided, the movement of the front or cover B will be efficient to also withdraw the frame D and bellows C and properly position the parts for the making of exposures. An arrangement is also provided, whereby the position of the extended frame may be adjusted relatively to the camera body so as to change the focus of the lens, if desired.

Mounted on the inner surface of the front B is a plate E having an upturned flange $e$ at one edge thereof and located near the side of said front B. Pivoted by a suitable screw and nut $f$ to said upturned flange $e$ is the outer end of a link or bar F, the inner end of said bar F being pivoted by a suitable pin $f'$ to the outer end of a second bar or link F'. The inner end of bar F' in turn is pivoted at $f^2$ to a side wall of the camera body A. Said bars F F' are adapted to be folded about their point of mutual connection $f'$, when the cover or front B of the camera is being closed, as shown in Fig. 6. On the other hand, when the front B is in full open position, as in Fig. 1, the bars F F' are extended in substantially a straight line, this serving to keep the frame D and other parts extended in proper position for making exposures through the connections which will be presently described. The outer portion of the link F is provided with an inturned flange $F^2$ having a depending ear $F^3$ which extends along the inner wall of upturned flange $e$ (Figs. 4 and 5) and is secured by the screw and nut $f$.

The frame D is provided with lateral extensions D', $D^2$ having respectively forwardly projecting ears $d'$, $d^2$. Pivotally mounted on said ears $d'$, $d^2$ are the upper ends of lever arms G, G', said lever arms being connected by a cross-bar $g$ whereby they may rock in unison about their pivots. The plate E is formed with a guideway E' extending along the side of the front B opposite to the upturned flange $e$ and the upper edge of said guideway E' is preferably curved inwardly, as shown in Fig. 3, whereby it may guide an arm H during the forward and rearward movements of said arm. Arm H is pivotally suspended from the ear $d^2$ of lateral extension $D^2$, preferably by the same pivot pin as lever arm G' and the lower end of arm H is formed with a hook $h$ engaging the guiding edge of guideway E'. The upper end of arm H engages the front face of extension $D^2$, as shown, and thereby prevents rearward tilting movement of the frame D, when the said frame is in the extended position, shown in Figs. 1 and 3, the hook $h$ of arm H being at this time at the forward high point of the curved guiding edge.

Secured in holes $d^3$ formed in extensions D' of the frame is a hook $i$ from which is suspended a spring I. The lower end of spring I is secured to plate E, as shown at $i'$, and the tension of said spring is in a direction to tilt the frame D rearwardly, when in extended position. The force of the spring however is resisted by arm H, as hereinbefore stated, and the combined result of these two forces is to keep the frame D positioned substantially in a vertical plane relatively to the camera body A, when the parts are extended for making exposures, this being necessary for the proper focusing of the lens, which is supported by the frame D.

Lever arm G is provided with a cam notch $g'$ which is adapted to be engaged by the upper edge $f^4$ of the flange $F^2$ of link F, this engagement serving to lock the parts in extended position. If link F is depressed the flange $F^2$ will ride down the cam surface of notch $g'$, thereby releasing lever arm G and permitting an upward movement of cover B to throw lever arm G to the position shown in Fig. 6. This movement is also communicated to lever arm G', and the result is that frame D is oscillated about the lower pivots of both said lever arms. It is most desirable that the tension of spring I be maintained in a direction to tilt frame D inwardly, during the folding of the camera. For this purpose, the pivot pin $g^3$ of arm G is elongated inwardly to engage the hook $i$ of the spring and thereby prevent the spring from springing above the pivot pin $g^3$ so as to exert its force in a direction to tilt frame D outwardly. When the parts are being folded, arm H rides down the curved edge of guideway E' and during that portion of its travel when arm H is at the lower portion of the curve, the spring I is permitted to tilt the upper edge of frame D inwardly. At this time, the bellows C is being folded within the camera body, and the slight tilting imparted to the frame assists in properly folding the bellows. Completion of the folding movement will bring the arm H at the inner high point of the guideway, so as to aline the frame D vertically within the camera body.

In operation, if the camera be folded, and it is desired to extend the parts to make exposures, the front or cover B is released by a proper operation of the clip A' and said cover B is pulled down until the links F F' are in alinement. This movement of the cover B through the lever arms G G' operates to draw frame D and the bellows C out of the camera body, arm H riding along the guideway E'. The spring I operates to pull the frame D forward into vertical position, this taking place because of the forward tension or pull exerted by the spring which oscillates lever arms G G' forwardly about their lower pivots and holds the cam surface of notch $g'$ firmly against flange $F^2$ so that the position of link F regulates the position of lever arm G and thereby in effect locks the parts in extended positions. The pull of spring I to throw the upper edge of frame D rearwardly, is resisted by arm H, which has arrived at the high point of the guideway, so that the frame is maintained in a vertical plane relatively to the camera body and the lens is properly focused.

Provision is made whereby the focus of the lens may be adjusted. For this purpose, the lower end of link F is formed with a lip F⁴ adapted to be engaged by the cam edge $k$ of a segment K rotatably mounted on plate E. The cam edge $k$ is shaped to raise and lower link F, when the position of segment K is changed, and this movement of the link F is imparted to link G to shift frame D slightly forwardly or rearwardly. Segment K is provided with a finger piece K′ whereby it may be easily adjusted by the hand. The movement of said segment is limited by stops $k'$ formed on the upper surface of plate E.

In the modification illustrated in Fig. 7, the frame D and extensions D′, D² are constructed of sufficient width to engage the entire surface of the bellows B when folded. This insures the bellows lying flat against the interior of the camera body.

What is claimed is:

1. In a folding camera, the combination with a camera body and a cover pivotally mounted on the front of the camera body, of an extensible bellows secured to the camera body, a lens and shutter supporting frame mounted on the front of the bellows, connections between the frame and cover for extending said frame and bellows when the cover is opened into horizontal position relatively to the camera body, and means connecting said frame with the cover for bringing the frame approximately into focusing position by the opening movement of the cover.

2. In a folding camera, the combination with a camera body and a cover pivotally mounted on the front of the camera body, of an extensible bellows secured to the camera body, a lens and shutter supporting frame mounted on the front of the bellows, connections between the frame and cover for extending said frame and bellows when the cover is opened into horizontal position relatively to the camera body, a spring connecting the frame with the cover and for bringing the said frame approximately into focusing position during the opening movement of the cover, and means for locking the frame in such focusing position.

3. In a folding camera, the combination with a camera body and a cover pivotally mounted on the front of the camera body, of an extensible bellows secured to the camera body, a lens and shutter supporting frame mounted on the front of the bellows, connections between the frame and cover for extending the frame and bellows when the cover is opened into horizontal position relatively to the camera body, and means for maintaining said frame parallel to the plane of the camera body when extended.

4. In a folding camera, the combination with a camera body and a cover pivotally mounted on the front of the camera body, of an extensible bellows secured to the camera body, a lens and shutter supporting frame mounted on the front of the bellows, connections between the frame and cover for extending the frame and bellows when the cover is opened into horizontal position, a spring connecting the frame with the cover and tending to oscillate the frame in one direction, and means for resisting the oscillatory movement of said spring, whereby the frame is maintained parallel to the plane of the camera body.

5. In a folding camera, the combination with a camera body and a cover pivotally mounted on the front of the camera body, of an extensible bellows secured to the camera body, a lens and shutter supporting frame mounted on the front of the bellows, a lever connecting the frame and cover for extending the frame when the cover is opened, and means for bringing the said frame into position to focus the lens during the final portion of the opening movement of the cover.

6. In a folding camera, the combination with a camera body and a cover pivotally mounted on the front of the camera body, of an extensible bellows secured to the camera body, a lens and shutter supporting frame mounted on the front of the bellows, a lever connecting the frame and cover for extending the frame when the cover is opened, and a spring connecting the frame with the cover for bringing the said frame into position to focus the lens during the final portion of the opening movement of the cover.

7. In a folding camera, the combination with a camera body and a cover pivotally mounted on the front of the camera body, of an extensible bellows secured to the camera body, a lens and shutter supporting frame mounted on the front of the bellows, a lever connecting the frame and cover whereby the frame is extended when the cover is opened, a spring connecting the frame with the cover for bringing the said frame into position to focus the lens during the final portion of the opening movement of the cover, and means for maintaining the extended frame parallel to the plane of the camera body.

8. In a folding camera, the combination with the camera body and a cover pivotally mounted on the front of the camera body, of an extensible bellows secured to the camera body, a lens and shutter supporting frame mounted on the front of the bellows, a lever connecting the frame and cover, whereby the frame is extended when the cover is opened, a spring connecting the frame and cover and exerting pull in a direction to tilt the upper edge of the frame inwardly toward the camera body, said spring operative to also bring the frame into position to focus the lens during the final portion of the opening movement of the cover, and means for resisting the pull of the spring on the extended frame.

9. In a folding camera, the combination with a camera body and a cover pivotally mounted on the front of the camera body, of an extensible bellows secured to the camera body, a lens and shutter supporting frame mounted on the front of the bellows, a lever connecting the frame and cover whereby the frame is extended when the cover is opened, a spring connecting the frame and cover and exerting pull in a direction to tilt the upper edge of the frame inwardly toward the camera body, said spring operative to bring the frame into position to focus the lens during the final portion of the opening movement of the cover, a guideway mounted on said cover, and a stop arm carried by the frame and slidable on the guideway, said stop arm resisting the pull of the spring on the extended frame.

10. In a folding camera, the combination with a camera body and a cover pivotally mounted on the front of the camera body, of an extensible bellows secured to the camera body, a lens and shutter supporting frame mounted on the front of the bellows, a lever connecting the frame and cover whereby the frame is extended when the cover is opened, a spring connecting the frame and cover and exerting pull in a direction to tilt the upper edge of the frame inwardly toward the camera body, means for maintaining the pull of the spring continuously in the same direction to keep the rotative effect on the frame continuously in the same direction, said spring operative to bring the frame into position to focus the lens during the final portion of the opening movement of the cover, and means for resisting the pull of the spring on the extended frame.

11. In a folding camera, the combination with a camera body and a cover pivotally mounted on the front of the camera body, of an extensible bellows secured to the camera body, a lens and shutter supporting frame mounted on the front of the bellows, a lever connecting the frame and cover whereby the frame is extended when the cover is opened, a spring connecting the frame and cover and exerting pull in a direction to tilt the upper edge of the frame inwardly toward the camera body, means for maintaining the pull of the spring continuously in the same direction to keep the rotative effect on the frame continuously in the same direction, said spring operative to bring the frame into position to focus the lens during the final portion of the opening movement of the cover, and means for resisting the pull of the spring on the extended frame, said means permitting tilting of the frame during the final portion of the movement of the cover.

12. In a folding camera, the combination with a camera body and a cover pivotally mounted on the front of the camera body, of an extensible bellows secured to the camera body, a lens and shutter supporting frame mounted on the front of the bellows, a lever connecting the frame and cover whereby the frame is extended when the cover is opened, a spring connecting the frame and cover and exerting pull in a direction to tilt the upper edge of the frame inwardly toward the camera body, means for maintaining the pull of the spring continuously in the same direction to keep the rotative effect on the frame continuously in the same direction, said spring operative to bring the frame into position to focus the lens during the final portion of the opening movement of the cover, means for resisting the pull of the spring on the extended frame, and means for locking the cover and frame in extended position.

13. In a folding camera, the combination with a camera body and a cover pivotally mounted on the front of the camera body, of an extensible bellows secured to the camera body, a lens and shutter supporting frame mounted on the front of the bellows, said frame being wider than the bellows when folded whereby the folded bellows may lie flat against the interior of the camera body, and connections between the frame and cover for extending said frame and bellows when the cover is opened into horizontal position, relatively to the camera body.

14. In a folding camera, the combination with a camera body and a cover pivotally mounted on the front of the camera body, of an extensible bellows secured to the camera body, a lens and shutter supporting frame, connections between the frame and cover for extending said frame and bellows when the cover is opened, said connections including a lever on each side of the frame, and spring means connecting the frame with the cover on one side of the frame for operating said connections simultaneously to bring the frame into position to focus the lens.

15. In a folding camera, the combination with a camera body and a cover pivotally mounted on the front of the camera body, of an extensible bellows secured to the camera body, a lens and shutter supporting frame, a lever on each side of the frame connecting the frame with the cover, a substantially rigid connection between said levers whereby they work in unison, and spring means on one side of the frame for operating said levers simultaneously to bring the frame into position to focus the lens.

16. In a folding camera, the combination with a camera body and a cover pivotally mounted on the front of the camera body, of an extensible bellows secured to the camera body, a lens and shutter supporting frame, a lever on each side of the frame connecting the frame with the cover, a substantially rigid connection between said levers whereby they work in unison, said connection being formed to lie flat against the cover when the camera is closed, and means on one side of the frame for operating said levers simultaneously to bring the frame into position to focus the lens.

17. In a folding camera, the combination with a camera body and a cover pivotally mounted on the front of the camera body, of an extensible bellows secured to the camera body, a lens and shutter supporting frame mounted on the front of the bellows, connections between the frame and the cover for extending said frame and bellows and links between the cover and camera body for regulating the relative movement of the cover and thereby the extent of motion of the lens and shutter supporting frame.

18. In a folding camera, the combination with a camera body and a cover pivotally mounted on the front of the camera body, of an extensible bellows secured to the camera body, a lens and shutter supporting frame mounted on the front of the bellows, and a lever forming the connection between the frame and cover, said lever having a cam surface, and connections between the cover and camera body adapted to bear on said cam surface and thereby regulate the movement of the lever.

19. In a folding camera, the combination with a camera body and a cover pivotally mounted on the front of the camera body, of an extensible bellows secured to the camera body, a lens and shutter supporting frame mounted on the front of said bellows, connections between said frame and cover for extending said frame and bellows, links between the cover and camera body for regulating the relative movement of the cover and thereby the extent of motion of said frame, and an adjustable stop for limiting the outward movement of the frame.

20. In a folding camera, the combination with a camera body and a cover pivotally mounted on the front of the camera body, of an extensible bellows secured to the camera body, a lens and shutter supporting frame mounted on the front of said bellows, connections between the frame and cover for extending said frame and bellows when the cover is opened to a horizontal position relative to the camera body and spring means for bringing said frame into position to focus the lens during the opening movement of the cover, the action of said spring being reduced in force when the camera is closed.

21. In a folding camera, the combination with a camera body and a cover pivotally mounted on the front of the camera body, of an extensible bellows secured to the camera body, a lens and shutter supporting frame mounted on the front of the bellows, connections between the frame and the cover for extending said frame and bellows when the cover is opened into horizontal position relatively to the camera body, and a spring connecting said frame with the cover for bringing the frame approximately into focusing position by the opening movement of the cover.

PAUL R. POWELL.

Copies of this patent may be obtained for five cents each, by addressing the "Commissioner of Patents, Washington, D. C."